United States Patent [19]

Taylor

[11] 4,149,601
[45] Apr. 17, 1979

[54] CULTIVATOR GLOVE

[76] Inventor: Paul B. Taylor, 1225 Charleston Ave., Huntington, W. Va. 25701

[21] Appl. No.: 828,769

[22] Filed: Aug. 29, 1977

[51] Int. Cl.² ............................................. A01B 1/06
[52] U.S. Cl. .................................. 172/370; 2/161 R; 30/298
[58] Field of Search .................... 172/370, 378; 130/4, 130/10; 294/25, 26, 55, 131; 2/16, 21, 161 R; 30/232, 298

[56] References Cited

U.S. PATENT DOCUMENTS

| 137,771 | 4/1873 | Gash et al. | 130/4 |
| 1,038,925 | 9/1912 | McCoig | 2/161 R |
| 2,409,101 | 10/1946 | Brittingham | 2/21 |
| 2,954,832 | 10/1960 | Pirone | 172/370 |
| 3,593,803 | 7/1871 | Ibach | 172/370 |

FOREIGN PATENT DOCUMENTS

| 223876 | 2/1958 | Australia | 172/378 |
| 836594 | 4/1952 | Fed. Rep. of Germany | 30/298 |
| 2239464 | 2/1974 | Fed. Rep. of Germany | 294/25 |
| 280113 | 4/1952 | Switzerland | 130/4 |
| 10424 of | 1891 | United Kingdom | 172/370 |
| 323863 | 1/1930 | United Kingdom | 172/370 |

Primary Examiner—Richard T. Stouffer
Attorney, Agent, or Firm—Edward G. Atkins

[57] ABSTRACT

An improved cultivator glove has been designed which comprises a full handed glove covering all four fingers and thumb and a point element attached to each finger and thumb of this glove wherein the point extends from one-half inch to one and one-half inches beyond the end of the fingers and thumb. The point element can be made of fiber glass or metal and can be attached to the glove by molding to the ends of the fingers and glove or by attaching said point to the underside of the fingers and glove.

4 Claims, 2 Drawing Figures

CULTIVATOR GLOVE

BACKGROUND OF THE INVENTION (1) Field of the Invention.

This invention relates generally to cultivator gloves for use in flower gardens and vegetable gardens and the like. More particularly, this invention relates to a cultivator glove having a series of points attached to the ends of the fingers and thumb of said glove which extends one-half inch to one and one-half inches beyond the ends of the fingers and thumb.

(2) Description of the Prior Art.

A number of devices are known to the art relating to cultivator gloves with points or two elements attached to the fingers and thumb of the glove itself. Among these are patents to Pirone (U.S. Pat. No. 2,954,832) and Ryden (U.S. Pat. No. 2,717,546). These devices, however, suffer the disadvantages of having either a tool or point element which did not extend beyong the end of the fingers and thumb of the glove, this causing excessive wear on the glove or inadequate cultivation or having a point or tool element which extends so far beyond the end of the glove as to make cultivating difficult. The device of this invention is directed to a cultivator glove having a point for cultivation or tilling the ground which extends from one-half inch to one and one-half inches beyond the fingers and thumb of the glove.

SUMMARY OF THE INVENTION

A cultivating device has been devised which comprises a full handed glove covering all four fingers and thumb and a point element attached to each finger and thumb of said glove wherein the point extends one-half inch to one and one-half inches beyond the ends of the fingers and thumb. This particular device can be used for cultivati- vating gardens and plants by clawing up ground around plants, keeping the soil loose and aerated and free of weeds.

The glove itself is a full handed glove, that is, it covers all fingers and the entire hand of the user. It is a heavy duty type glove as is well known to the art and can be made from any heavy duty fabric. It is important that the points extend beyond the ends of the fingers and thumb not less than one-half inch nor more than one and one-half inches. The wearer of the glove is able to use this device to grasp and loosen soil around small plants providing an easier and more advantageous method of cultivating and weeding as compared to other methods, i.e., hoeing. These gloves will also protect the hands in those small cultivating jobs around plants where precision weeding and cultivating are required.

The material from which the points are made is not critical, preferably being metal or fiber glass or some other firm material. The points are attached to the glove by molding such points to the ends of the glove or by attaching them to the glove by adhesives, i.e., glue, etc. The points should be sharp and curve or extend 90 degrees from the plane of the glove. A cultivator glove having a point one-half inch to one inch beyond the ends of the fingers and thumb is most preferable.

DESCRIPTION OF THE PREFERRED EMBODIMENTS

Figure 1:
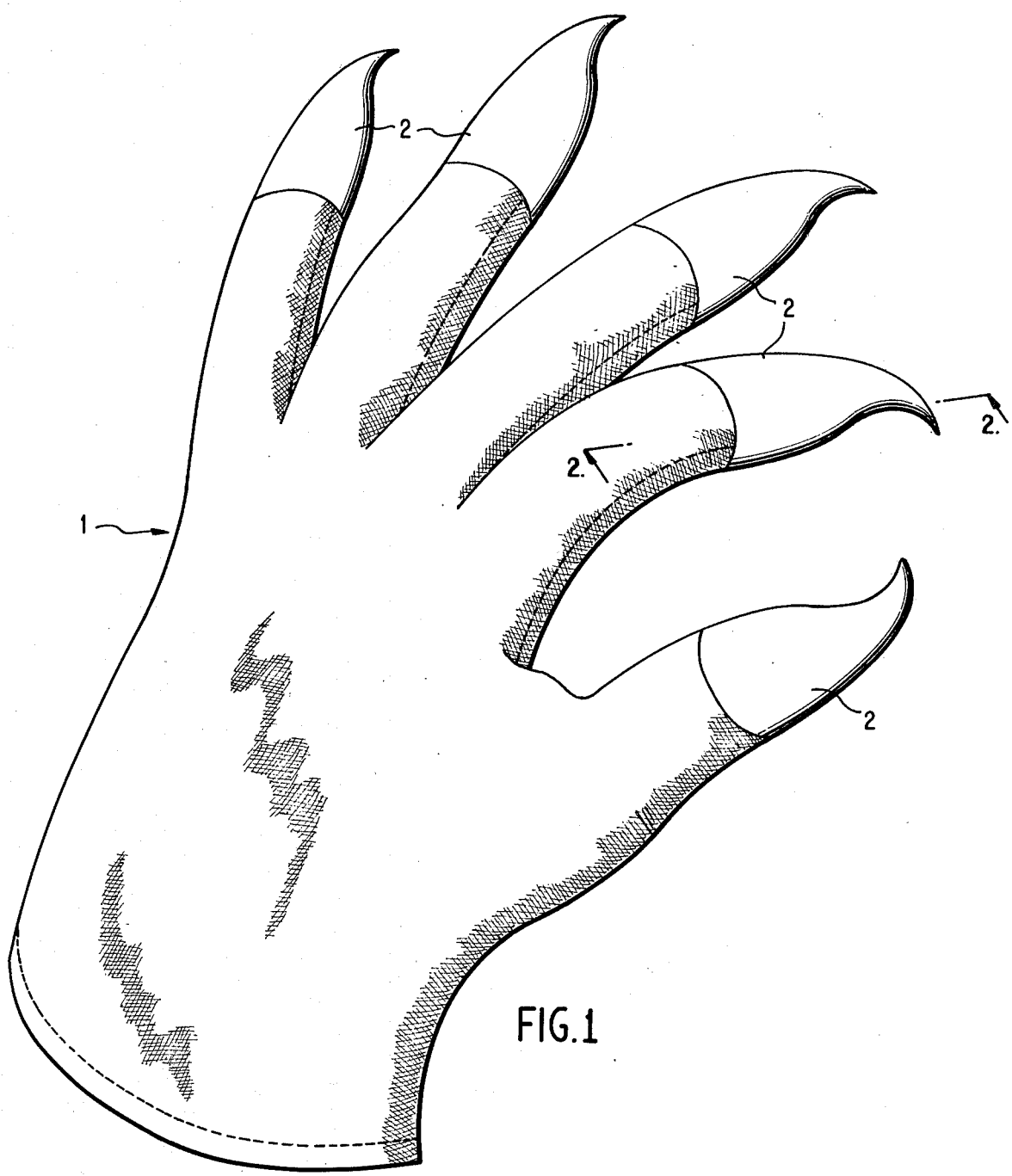
FIG. 1 is an isometric view of the glove, the subject of this invention.

Referring now to FIG. 1, cultivator point elements 2 are shown attached to the fingers and thumb of glove 1. The cultivator point elements 2 extend outwardly one-half inch to one and one-half inches beyond the ends of the fingers and thumb and also extend downwardly below the plane of the glove to 90 degrees.

The point elements themselves begin at the ends of the fingers and thumb and gradually taper to a point. As seen in FIG. 1, point element 2 has a large, well-defined end adapted for attachment to the glove and an end having a sharp point designed for cultivation. The large end has a diameter only slightly larger than the finger of the glcve on which it is attached, i.e., being of sufficient size to accomodate the end of the glove finger to which it is attached. The diameter of the point element as it approaches the sharp end point halfway between the end of the point element attached to the glove and the sharp cultivator point would generally be approximately one-half of the diameter of the end of this point element attached to the glove finger. This provides extra strength to the point element.

Figure 2:
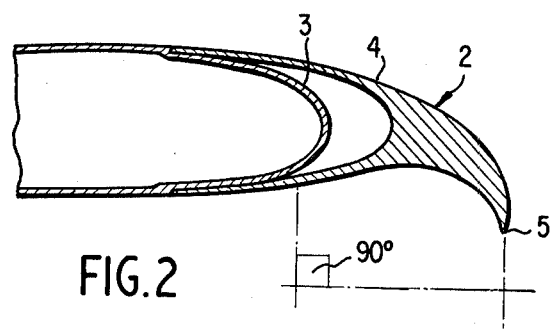
FIG. 2 is a longitudal cross-sectional view of the index finger of the glove along 2—2 of FIG. 1.

FIG. 2 shows the index finger in cross-sectional view. Point element 2 is attached to finger end 3 by either molding or by a layer of adhesive between finger end 3 and side 4 of point element 2 said side 4 being formed by the hollowed portion of the point element into which the finger end is inserted. Numeral 5 refers to the sharp point or working end of the point element.

I claim:

1. A cultivator glove comprising:
   (a) a full-handed glove covering all four fingers and thumb, and
   (b) a point element attached to and entirely enclosing the end of each finger and thumb of said glove, wherein said point element has one end having a diameter of sufficient size to accomodate the end of the gloved finger to which said point element is attached and ending in a sharp point, said point element being generally conically shaped from said one end to adjacent said sharp point, the diameter of each said point element tapering throughout its entire length from the end of the glove finger to which it is attached to the sharp point, said point element adjacent said sharp point curving to such a degree that said point extends approximately 90 degrees from the plane of the glove.

2. A cultivator glove as in claim 1 wherein the diameter of the point element at a point approximately halfway between both ends of the point element is approximately one-half of the diameter of the end of the point element attached to the gloved finger.

3. A cultivator glove as in claim 1 where each of the points extends ½ inch to 1-½ inches beyond the end of the respective fingers and thumb to which it is attached.

4. A cultivator glove as in claim 1 wherein each of the point elements is adhesively attached to the end one of the fingers and thumb of the glove.

* * * * *